US009328650B2

(12) United States Patent
Reynolds et al.

(10) Patent No.: US 9,328,650 B2
(45) Date of Patent: May 3, 2016

(54) ENGINE COOLING SYSTEM

(71) Applicant: The Boeing Company, Chicago, IL (US)

(72) Inventors: Travis A. Reynolds, Everett, WA (US); David S. Krug, Kirkland, WA (US); Michelle Louise Courtney, Palmdale, CA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/626,412

(22) Filed: Feb. 19, 2015

(65) Prior Publication Data
US 2015/0159539 A1 Jun. 11, 2015

Related U.S. Application Data

(63) Continuation of application No. 13/911,485, filed on Jun. 6, 2013, now Pat. No. 8,978,628.

(51) Int. Cl.
*F01P 7/10* (2006.01)
*F01P 3/00* (2006.01)
*F02B 29/04* (2006.01)
*F01P 11/10* (2006.01)

(52) U.S. Cl.
CPC ...... *F01P 7/10* (2013.01); *F01P 3/00* (2013.01); *F01P 11/10* (2013.01); *F02B 29/0412* (2013.01); *F02B 29/0418* (2013.01); *F02B 29/0443* (2013.01); *F01P 2060/16* (2013.01)

(58) Field of Classification Search
CPC ......... F01P 7/10; F01P 11/10; F02B 29/0412; F02B 29/0431
See application file for complete search history.

(56) References Cited

U.S. PATENT DOCUMENTS

| 3,752,422 A | 8/1973 | Runnels et al. |
| 4,236,492 A | 12/1980 | Tholen |
| 4,779,577 A | 10/1988 | Ritter et al. |

(Continued)

FOREIGN PATENT DOCUMENTS

| EP | 2219946 | 9/2011 |
| GB | 768975 | 2/1957 |
| WO | 2005/063564 | 7/2005 |

OTHER PUBLICATIONS

International Search Report, International Application No. PCT/US2007/084550 (Sep. 30, 2008).

(Continued)

*Primary Examiner* — Lindsay Low
*Assistant Examiner* — Kevin Lathers
(74) *Attorney, Agent, or Firm* — Thompson Hine LLP

(57) ABSTRACT

An engine cooling system may include a housing forming an enclosed duct having an air intake opening, an air intake door, an exhaust opening, and an exhaust door; at least one heat exchanger positioned within the duct such that ambient air entering the air intake opening flows through the duct to contact the at least one heat exchanger and exits the duct through the exhaust opening; and a controller connected to vary a degree that one or both of the air intake door and exhaust door is open to modulate a mass flow rate of ambient air contacting the at least one heat exchanger to vary a heat transfer from the at least one heat exchanger to the ambient air in the duct to maintain a temperature of a fluid within the at least one heat exchanger within a preferred temperature range.

20 Claims, 3 Drawing Sheets

(56) References Cited

U.S. PATENT DOCUMENTS

| | | | | |
|---|---|---|---|---|
| 4,924,826 | A | * | 5/1990 | Vinson .................. 123/195 C |
| 5,704,218 | A | * | 1/1998 | Christians et al. .............. 62/172 |
| 5,709,103 | A | | 1/1998 | Williams |
| 6,142,108 | A | | 11/2000 | Blichmann |
| 6,981,388 | B2 | | 1/2006 | Brutscher et al. |
| 7,849,702 | B2 | | 12/2010 | Parikh |
| 2002/0152765 | A1 | | 10/2002 | Sauterleute et al. |
| 2004/0014419 | A1 | | 1/2004 | Lents et al. |
| 2004/0065308 | A1 | | 4/2004 | Bryant |
| 2006/0021606 | A1 | * | 2/2006 | Bryant .................. 123/562 |
| 2011/0259546 | A1 | | 10/2011 | DeFrancesco et al. |

OTHER PUBLICATIONS

International Preliminary Report on Patentability, International Application No. PCT/US2007/084550 (May 18, 2010).

EPO, Decision to Grant a European Patent, European Application No. 07874271.5 (EP 2219946) (Aug. 25, 2011).

EPO, Communication regarding Opposition, European Application No. 07874271.5 (EP 2219946) (Sep. 3, 2013).

Lathers, Kevin Anthony; Non-Final Office Action; U.S. Appl. No. 13/911,485 (Sep. 3, 2014).

Lathers, Kevin Anthony; Notice of Allowance; U.S. Appl. No. 13/911,485 (Nov. 7, 2014).

* cited by examiner

ENGINE COOLING SYSTEM

FIELD

The present disclosure relates to engine cooling systems and, more particularly, to engine cooling systems for use onboard aircraft and other vehicles.

BACKGROUND

To function properly at altitude, where air pressure has a low density, internal combustion engines on board vehicles, such as aircraft, use cooling air to condition intake air for proper engine function. Such engines use a compressor to increase the mass of flow rate of air to the engine intake. Because a compressor increases the temperature of the charge air, the engine intake also includes an intercooler or heat exchanger to cool the compressed air. Further, such engines may include one or more radiators to dissipate engine heat during operation.

However, if an intercooler undercools the charge air to an engine, such undercooled air can adversely affect the performance of the engine. Conversely, if the operation of the intercooler rejects excessive amounts of heat into the cooling air stream, the radiator would need to be oversized due to the warmer cooling air steam or, and hence the engine, may be adversely affected. In addition, such engines need to be capable of operation at low altitude or ground, where the aircraft is moving at a relatively low velocity, or is stationary. Accordingly, there is a need for a compact engine cooling system for an aircraft that utilizes minimally sized components despite the potential for divergent thermal rejection requirements that would have different optimal configurations for altitude and on ground.

SUMMARY

In an embodiment, the disclosed engine cooling system may include a housing forming an enclosed duct having an air intake opening, an air intake door, an exhaust opening, and an exhaust door; at least one heat exchanger positioned within the duct such that ambient air entering the air intake opening flows through the duct to contact the at least one heat exchanger and exits the duct through the exhaust opening; and a controller connected to vary a degree that one or both of the air intake door and exhaust door is open to modulate a mass flow rate of ambient air contacting the at least one heat exchanger to vary a heat transfer from the at least one heat exchanger to the ambient air in the duct to maintain a temperature of a fluid within the at least one heat exchanger within a preferred temperature range.

In another embodiment, the disclosed vehicle may include an internal combustion engine; a compartment having an enclosed duct having an air intake opening, an air intake door, an exhaust opening, and an exhaust door; at least one heat exchanger positioned within the duct such that ambient air entering the air intake opening flows through the duct to contact the at least one heat exchanger and exits the duct through the exhaust opening; and a controller connected to vary a degree that one or both of the air intake door and exhaust door is open to modulate a mass flow rate of ambient air contacting the at least one heat exchanger to vary a heat transfer from the at least one heat exchanger to the ambient air in the duct to maintain a temperature of a fluid within the at least one heat exchanger within a preferred temperature range; wherein the vehicle is selected from an aircraft, a land vehicle, an amphibious vehicle, a marine vehicle, and a submarine vehicle.

In yet another embodiment, the disclosed method for making a cooling system for an engine in a vehicle, the vehicle including a housing forming an enclosed duct having an air intake opening, an air intake door, an exhaust opening, and an exhaust door, may include placing at least one heat exchanger within the duct between the air intake opening and the exhaust opening; connecting a controller to actuate the air intake door and the exhaust door to a fully open position and a fully closed position, as well as positions intermediate the fully closed position and the fully open position; and programming the controller to vary a degree that one or both of the air intake door and exhaust door is open to modulate a mass flow rate of ambient air contacting the at least one heat exchanger to vary heat transfer from the at least one heat exchanger to the ambient air in the duct to maintain a temperature of a fluid within the at least one heat exchanger within a preferred temperature range.

Other objects and advantages of the disclosed method and system for engine cooling will be apparent from the following description, the accompanying drawings and the appended claims.

DETAILED DESCRIPTION

Figure 1:
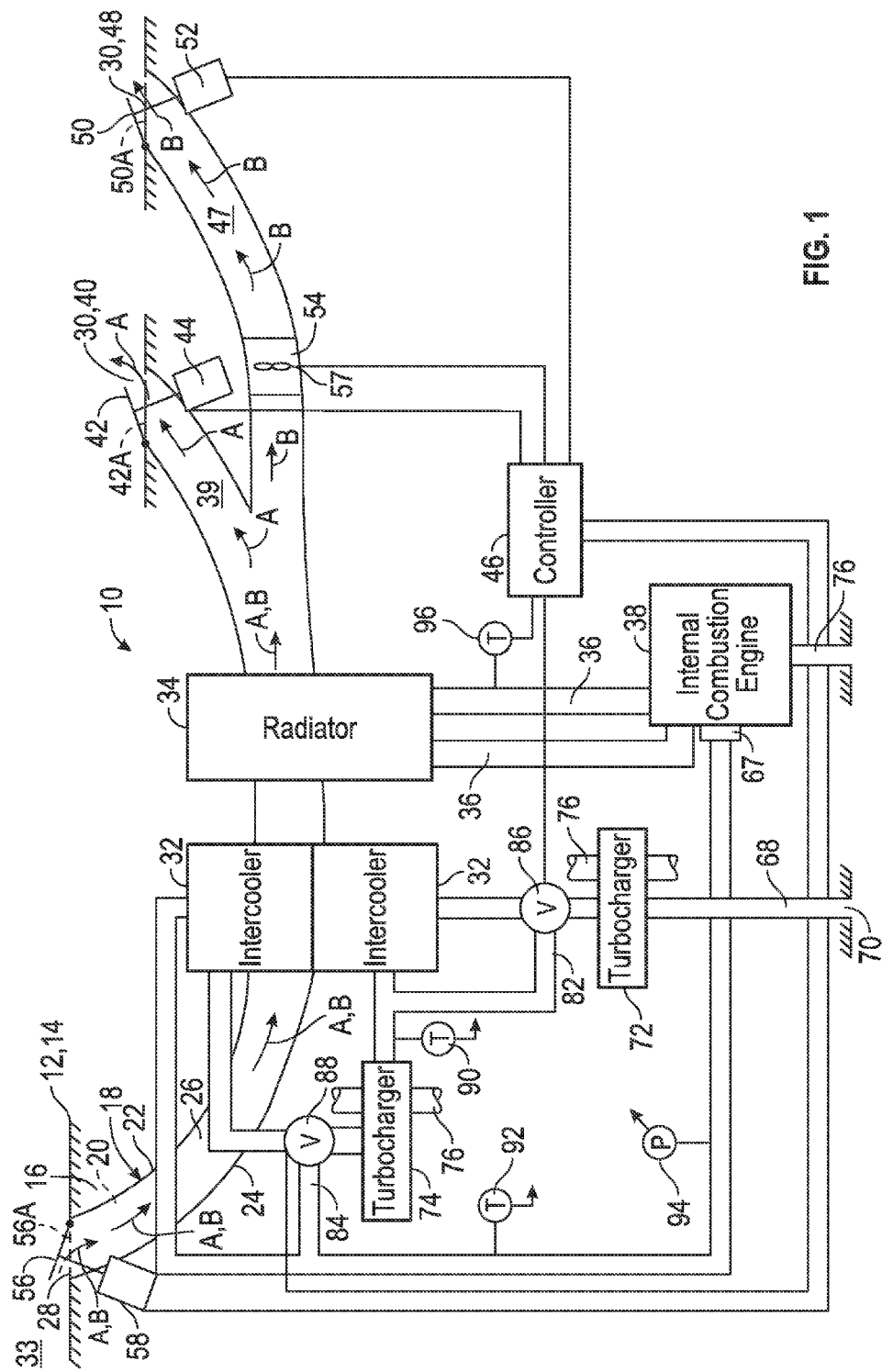
FIG. 1 is a schematic side elevation of an embodiment of the disclosed engine cooling system.

As shown in FIG. 1, engine cooling system, generally designated 10, may be mounted in a vehicle, such as in the fuselage 12 of an aircraft 14. In the embodiment shown, the cooling system 10 may be mounted in a compartment 16 of the aircraft 14, which in an embodiment may be a tail cone. In embodiments, the aircraft 14 may be a jet aircraft, a propeller driven aircraft, a helicopter, a lighter than air aircraft, and the like. In embodiments, the vehicle represented as an aircraft 14 in FIG. 1 may be selected from a land vehicle, an amphibious vehicle, a marine vehicle, and a submarine vehicle, each having a compartment 16 containing the cooling system 10.

The engine cooling system 10 may include a housing, generally designated 18, having opposing side walls 20 (only one of which is shown), a top wall 22 and a bottom wall 24. Walls 20, 22, 24 may form an enclosed duct 26 having an air intake opening 28 and an exhaust opening, generally designated 30. In an embodiment, the duct 26 may be substantially round in cross section, or may have a shape selected to fit the compartment 16 in which it is placed.

Figure 2:
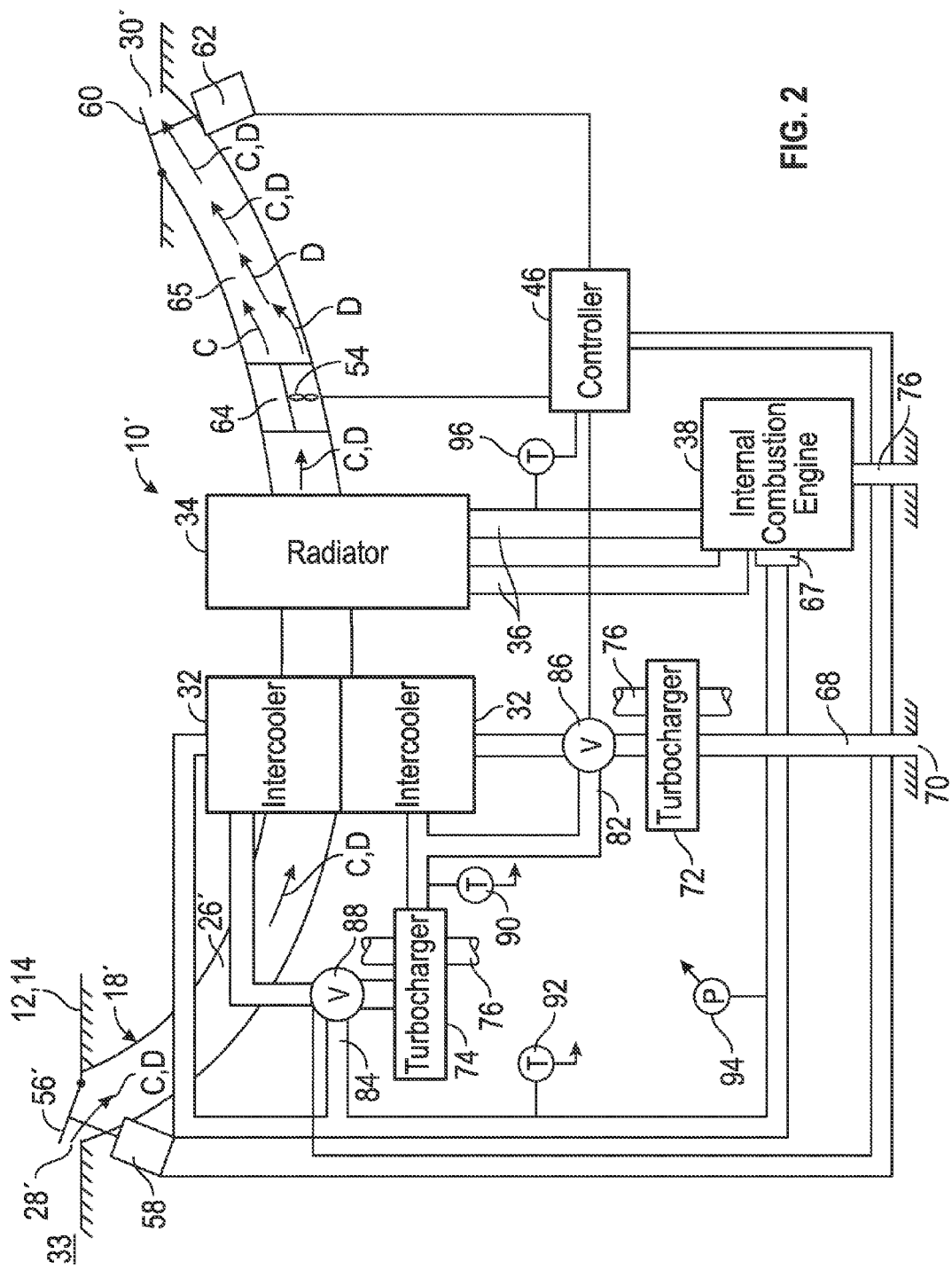
FIG. 2 is a schematic side elevation of another embodiment of the disclosed engine cooling system.
Figure 3:
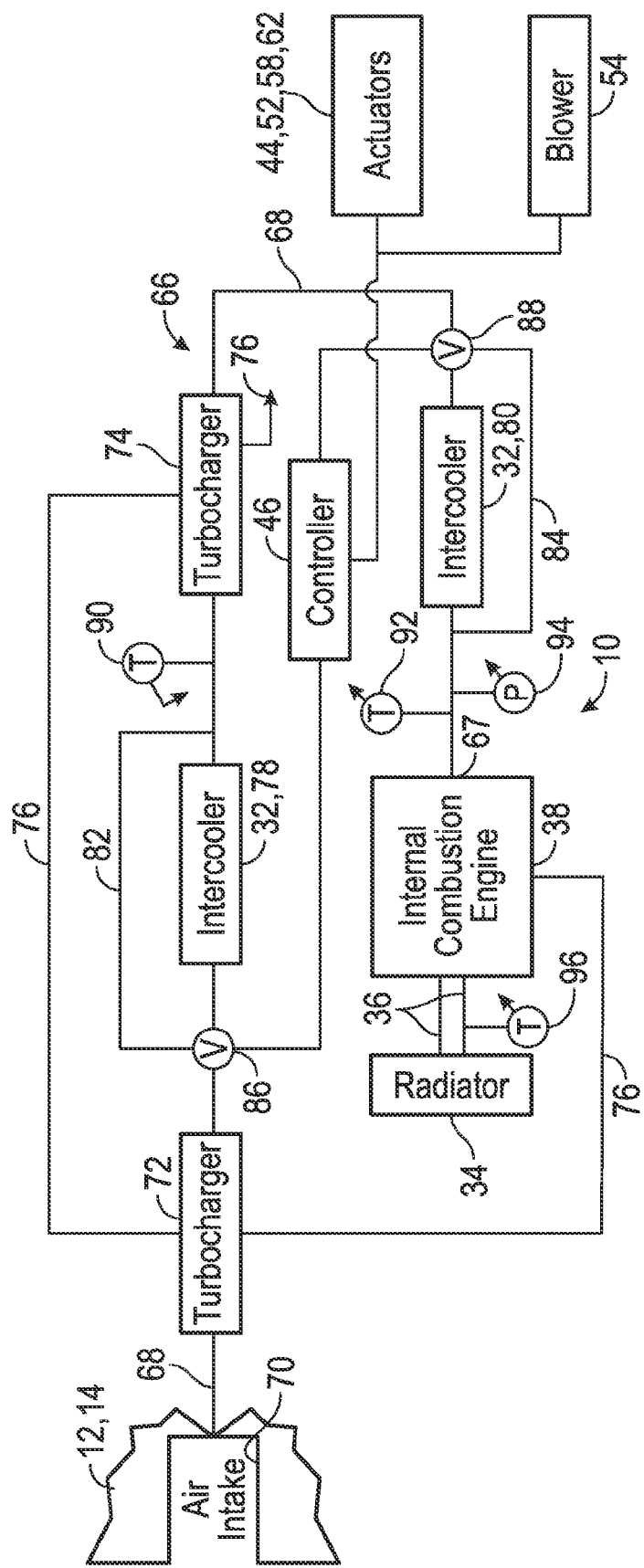
FIG. 3 is a schematic of the charge air system of the disclosed engine cooling system.

At least one heat exchanger, which in the embodiment of FIG. 1 may take the form of at least one intercooler, which in an embodiment may include intercooler 32, may be positioned within the duct 26 such that air from the ambient 33 entering the air intake opening 28 may contact the at least one heat exchanger. In the embodiment shown in FIG. 1, the at least one heat exchanger 32 may include first and second intercoolers 32 positioned in parallel in the duct 26. In other embodiments, more than two heat exchangers 32 may be positioned in the duct 26. In an embodiment, the heat exchangers 32 may be arranged in series in the duct 26. At least one radiator 34 may be positioned in the duct 26 downstream of the heat exchangers 32. In another embodiment, at least the radiator 34 may include two radiators positioned in parallel. In other embodiments, the radiator 34 may be arranged in series in the duct 26. As shown in FIGS. 1, 2, and 3, the radiator 34 may be connected by a coolant line 36 to circulate coolant to an internal combustion engine 38.

As shown in FIG. 1, the duct 26 may be configured such that the exhaust opening 30 may be positioned downstream of the heat exchangers 32 and radiator 34, such that ambient air flowing into the air intake opening 28 may flow through the duct to contact the heat exchanger and the radiator, and exit the duct through the exhaust opening.

In an embodiment, the exhaust opening 30 may include a passive flow duct segment 39, which may comprise a terminal branch of the duct 26. The exhaust opening 30 may include a passive flow exhaust opening 40 communicating with the passive flow duct segment 39. The passive flow exhaust opening 40 may include a positionable passive flow exhaust door 42 configured to modulate air flow through the duct 26 and duct segment 39. The passive flow exhaust door 42 may be positioned by an actuator 44 that is activated by a controller 46 (see also FIG. 3).

The exhaust opening 30 may include a motive flow duct segment 47, which may comprise a terminal branch of the duct 26. The exhaust opening 30 may include a motive flow exhaust opening 48 communicating with the motive flow exhaust duct segment 47. The motive flow exhaust opening 48 may include a positionable motive flow exhaust door 50 configured to modulate air flow through the duct 26 and motive flow duct segment 47. The motive flow exhaust door 50 may include an actuator 52 that may be activated by the control 46 (see also FIG. 3). The actuators 44, 52 may be configured to position the passive flow exhaust door 42 and motive flow exhaust door 48, respectively, individually between closed configurations, in which no air may flow through the associated exhaust openings 40, 48, respectively, to open configurations, namely, to varying degrees of being open.

The cooling system 10 also may include a blower 54, which in an embodiment may be in the form of a fan. In other embodiments, the blower 54 may comprise any type of air moving device. The blower 54 may be located within the duct 26 at a location downstream of the heat exchanger 32 and radiator 34, and upstream of the exhaust opening 48. In an embodiment, the blower may be located in the motive flow duct segment 47. The blower 54 may be actuated by the controller 46.

The duct 26 also may include a positionable intake door 56 configured to modulate air flow through the duct. The positionable intake door 56 may include an actuator 58 that may be activated by controller 46. Actuator 58 may position intake door 56 from a fully closed configuration, shown as intake door 56A in phantom, to a fully open configuration as shown in FIG. 1, as well as positions intermediate a fully closed and a fully open position. In an embodiment, the intake door 56 may be shaped to provide a smooth surface relative to the outer surface of the fuselage 12 of the aircraft 14 when positioned in a fully closed configuration.

As shown in FIG. 1, the engine cooling system 10 may be configured by the controller 46, which is connected to actuate one or more of the passive flow exhaust door 42, the motive flow exhaust door 50, the blower 54, and the intake door 56. The controller 46 is connected to open the air intake door 56 and passive flow exhaust door 42 to open configurations, and modulate the motive flow exhaust door 50 to a closed configuration, shown as motive flow exhaust door 50A in phantom. In this configuration, ambient air 33 entering the intake opening 28 may follow the direction of arrows A. Thus, air from the ambient 33 may enter the intake opening 28 of the duct 26 and travel across the intercoolers 32 and radiator 34, where the ambient air may pick up heat from the heat exchanger and radiator, then flow through passive flow duct segment 39 and exit the passive flow exhaust opening 40. Because the motive flow exhaust door 50A may be in a closed configuration, ambient air flowing through the duct 26 may not be able to flow through motive flow duct segment 47 and exit the motive flow exhaust opening 48, and thus may not flow across the blower 54. This may prevent "windmilling" of the turbine blade 57 of the blower 54.

The foregoing configuration of the engine cooling system 10 of FIG. 1 may be employed when the aircraft 14 is in flight. Under that condition, ambient air may be forced into the intake opening 28, and may be diverted into the intake opening by the shape and positioning of the open intake door 56. The controller 46 may vary the degree that the one or both of the intake door 56 and passive flow exhaust door 42 may be open in order to modulate the mass flow rate of ambient air across the intercoolers 32 and radiator 34 in order to vary the heat transfer from the intercoolers 32 and radiator 34 to the ambient air in the duct 26 to maintain the temperatures of the fluids within the intercoolers and radiator within preferred temperature ranges, while minimizing the amount of excrescence drag from the open doors 56, 42.

As shown in FIG. 1, the engine cooling system 10 may be configured by the control 46 to modulate the motive flow exhaust door 50 to an open configuration, and the passive flow exhaust door 42A to the closed configuration. This may prevent ambient air flowing into the duct 26 through the intake opening 28 from flowing through the passive flow duct segment 39 and exiting the passive flow exhaust opening 40, and instead direct it to the motive flow duct segment 47 and motive flow exhaust opening 48, as shown by the arrows B. In this configuration, the intake door 56 may be modulated to an open configuration and the blower 54 may be actuated by the control 46. The action of the blower 54 may draw air from the ambient 33 in through the intake opening 28, through the duct 26 and across the intercoolers 32 and radiator 34 before flowing through the motive flow duct segment 47 and exiting the motive flow exhaust opening 48.

The foregoing configuration of the cooling system 10 may be employed when the associated aircraft 14 is on the ground and the relative velocity of ambient air through the duct 26 otherwise may be insufficient to provide the desired cooling effect on the intercoolers 32 and radiator 34. Further, this configuration may be used when the associated aircraft 14 may be flying at low altitudes and/or when the ambient air 33 is at an elevated temperature.

As shown in FIG. 2, in an alternate embodiment of the engine cooling system 10', the housing 18' may form a duct 26' having an intake opening 28' that may be selectively opened and closed by an intake door 56', and further may include an exhaust opening 30 having a positionable exhaust door 60 that may be positioned by an actuator 62 controlled by the controller 46 to selectively position the exhaust door 60 to a closed configuration, in which all or substantially all air flow through duct 26' is shut off, to the open configuration shown by door 60, in which air in the duct is permitted to exit the exhaust opening 30'. A check valve 64 may be positioned within the duct 26' and arranged in parallel with the blower 54.

In an embodiment, the check valve 64 may be positioned adjacent to the blower 54 so that the blower and check valve span the duct 26' downstream of the at least one heat exchanger, which in an embodiment may include intercoolers 32, and radiator 34. When the associated aircraft 14 is at altitude, the intake door 56' may be modulated to an open configuration by control 46, thus allowing air from the ambient 33 to enter the intake opening 28' and flow through the duct 26'. When the exhaust door 60 is modulated to an open configuration by the control 46, thereby opening the exhaust opening 30, ambient air may flow through the duct 26 in the direction of arrows C. Following the path of least resistance, the ambient air may flow across the intercoolers 32 and radiator 34, then through the check valve 64, which may be biased to allow air flow in a downstream direction (i.e., the direction of arrows C), and out the exhaust opening 30'.

In an embodiment, the blower 54 may be locked in a static position, or may be allowed to windmill, or may include louvers that may be shut by the controller 46 so there may be no, or substantially no, air flow through the blower. Again, the controller 46 may modulate the positioning of the intake door 56' and the exhaust door 60 between fully open and closed configurations to vary the flow of ambient air through the duct 26' to provide the desired degree of cooling for the intercoolers 32 and radiator 34.

When the associated aircraft 14 is in a stationary position, such as on the ground, or in a low altitude, low velocity flight, the blower 54 may be actuated by the control 46. In this configuration air from the ambient 33 may be drawn in through the intake opening 28' and follow the direction of arrows D through the duct 26'. The blower 54 may draw ambient air across the intercoolers 32 and radiator 34 and out the exhaust opening 30'. Because the blower 54 may create a backpressure in the terminal segment 65 of the duct 26' downstream of the blower, the pressure differential across the check valve 64 may close the check valve and thus prevent air flow through the check valve in both a downstream and an upstream direction. In an embodiment, the check valve 64 may be configured to prevent air flow in an upstream direction. This backpressure may be aided in part by selective positioning of the exhaust door 60 by the control 46.

As shown in FIGS. 1, 2 and 3, the engine cooling systems 10, 10' may be connected to provide cooling of two discrete cooling systems. The first system may be a cooling system for the engine 38 and may include the radiator 34 connected by the coolant line 36 to the engine.

The second cooling system, generally designated 66 (FIG. 3), may provide conditioned charge air to the intake manifold 67 of the internal combustion engine 38. The system 66 may include a charge air or combustion air intake line 68 that draws air from an air intake 70 that may be formed in the fuselage 12 of the aircraft 14. The air intake line 68 may include a first turbocharger 72 and a second turbocharger 74. Turbochargers 72, 74 may be powered by exhaust gases from the engine 38 traveling through exhaust line 76 that turn turbines associated with the turbochargers. In an alternate embodiment, one or both of the turbochargers 72, 74 may be powered by an electric motor. The intercoolers 32 may be connected to the combustion air intake line 68. The combustion air intake line 68 may include at least one bypass line, which may take the form of bypass lines 82, 84 connected to divert intake air around intercoolers 78, 80, respectively.

The system 66 may include modulating valves 86, 88 that are connected to the bypass lines 82, 84, respectively, upstream of the intercoolers 78, 80 and actuated by control 46. Control 46 may modulate valves 86, 88 to modulate an amount of combustion air diverted around the intercoolers 78, 80 through bypass lines 82, 84, and an amount of combustion air flowing through the intercoolers 78, 80. The system 66 also may include sensors in the form of first and second thermocouples 90, 92 that are configured to determine the temperature of the combustion air in the combustion air intake line 68 and transmit a signal to control 46, which receives the temperature signal from the sensors. In the embodiment shown, thermocouple 90 may be positioned between intercooler 78 and turbocharger 74, and thermocouple 92 may be positioned between intercooler 80 and engine intake manifold 67. Optionally, the system 66 may include a pressure sensor 94, which may be located immediately upstream of the engine intake manifold 67, that may send a signal to the controller 46 representing the pressure of the charge air in the intake line 68 at that point. Optionally, the system 66 may include a thermocouple 96, which may be located on the coolant line 36, that may send a signal to the controller 46 representing the temperature of the coolant flowing from the radiator 34 to the engine 38.

In operation, ambient air 33 may enter through the air intake 70 and travel through the combustion air intake line 68 to the first turbocharger 72, where it may be pressurized and as a result, heat is added to the air. Based upon the amount of heat added to the air and the temperature limit for the second turbocharger 74, either the air travels through the intercooler 78 to be cooled, or a portion or all of the air travels through the bypass line 82. In response to temperature signal readings from thermocouples 90, 92, the controller 46 may modulate the amount of combustion air flowing through intercooler 78 and intercooler 80 and the amount of combustion air diverted by valve 86 and valve 88 to bypass lines 82, 84, respectively, around the intercoolers, thereby controlling the amount of heat extracted from the combustion air.

The ratio of bypass air to cooled air may be determined by comparing the temperature detected by the thermocouple 90 to the maximum permitted inlet temperature of the second turbocharger 74. Combustion air within a preferred temperature range may enter the second turbocharger 74, where it may be further pressurized and consequently heated. Based upon the amount of heat added to the combustion air by the turbocharger 74, the combustion air may flow downstream to the second intercooler 80 where it either passes through the intercooler 32 and is cooled, or some or all of it is diverted by valve 88 to bypass line 84. Again, the bypass ratio may be determined from the temperature and pressure of the air, measured at thermocouple 92 and pressure sensor 94, respectively. The controller 46 may be programmed with selected values for the temperature limit for the engine intake manifold 67, desired intake pressure and desired mass and volumetric flow of combustion air. This combination of intercoolers 78, 80, bypass loops 82, 84, thermocouples 90, 92 and controller 46 may provide optimized cooling to ensure that the combustion air entering the engine intake manifold 67 of the engine 38 may be within a preferred temperature range— no higher than the upper temperature limit and not overcooled.

Overcooling the combustion air may have undesirable repercussions as it may necessitate increased cooling airflow, indicated by arrows A, B, C, and D, or a larger downstream heat exchanger (the radiator 34 in duct 26 as shown in FIGS. 1 and 2), as well raise the temperature of the cooling air, which may require higher temperature-rated components downstream. Increased cooling flow on the ground may require a physically larger blower 54 and/or an operating speed increase and an associated increase in power to drive the blower. In flight, the increased cooling airflow could increase the amount of drag on the aircraft due to the doors 56, 60, and 42 being opened further into the airstream and the increased cooling drag associated with the increased flow velocity within duct 26, duct segment 39, radiator 34, terminal segment 65, and intercoolers 78, 80.

The thermal requirements of the intercoolers 78, 80 and radiator 34 may vary with the altitude of the vehicle, such as aircraft 14, associated with the engine 38, independently of each other and therefore the intercoolers 32 typically may be sized to the largest size with the most demanding thermal load. During altitude operation, turbochargers 72, 74 may be utilized more, which may require a higher thermal load for the intercoolers 78, 80, which may create the sizing point for the intercoolers at altitude. The thermal load for the intercoolers 78, 80 when the vehicle, such as aircraft 14, associated with the engine 38 is not in motion and on ground may be relatively low. However, since the intercoolers 78, 80 may be sized for altitude operation, they may overheat the cooling air in the duct 26 (FIGS. 1 and 2), which may make it more difficult to meet the thermal requirements of the radiator 34.

Because the intercoolers 78, 80 may have combustion air flowing through them at much higher temperatures than that of the engine coolant, they may overheat the cooling air A, B, C, and D, making it difficult or impossible to cool the radiator 34. However, by using the configuration of the optimized cooling control system 66 shown in FIG. 3, only the required amount of heat may be transferred from the intercoolers 78, 80. This optimization may be effected by providing the bypass lines 82, 84, which may provide combustion air to the engine intake manifold 67 within a preferred temperature range. The thermocouple 96 monitors engine coolant temperature to ensure adequate cooling of radiator 34. Further, with the engine cooling system 10, the control 46 may be configured to modulate the passive flow exhaust door 42 to an open configuration and modulate the motive flow exhaust door 50 to a closed configuration 50A when a vehicle, such as aircraft 14, associated with the engine 38, is in motion; and to modulate the motive flow exhaust door 50 to an open configuration and the passive flow exhaust door to a closed configuration 42A when the vehicle associated with the engine 38 may not be in motion, such as when the aircraft 14 is stationary on the ground.

Accordingly, the disclosed method for making a cooling system 10' for an engine 38 in a vehicle 12 includes a housing 18 forming an enclosed duct 26 having an air intake opening 28, an air intake door 56', an exhaust opening 30, and an exhaust door 60. The system 10' may include placing at least one heat exchanger 32 within the duct 26 between the air intake opening 28 and the exhaust opening 30' and connecting the controller 46 to actuate the air intake door 56' and the exhaust door 60 to a fully open position and a fully closed position, as well as positions intermediate the fully closed position and the fully open position. The controller 46 may be programmed to vary a degree that one or both of the air intake door 56' and exhaust door 60 is open to modulate a mass flow rate of ambient air 33 contacting the at least one heat exchanger 32 to vary heat transfer from the at least one heat exchanger to the ambient air in the duct 26 to maintain a temperature of a fluid within the at least one heat exchanger within a preferred temperature range.

While the methods and forms of apparatus herein described constitute preferred embodiments of the invention, it is to be understood that the invention may not be limited to these precise forms of apparatus and methods, and that changes may be made therein without departing from the scope of the invention.

What is claimed is:

1. An engine cooling system for a vehicle, the cooling system comprising:

a combustion air intake line that draws air from a first air intake formed in a fuselage of the vehicle, the combustion air intake line connected to an engine intake manifold for a vehicle engine;

a housing forming an enclosed duct having a second air intake opening formed in the fuselage, an air intake door for selectively covering the second air intake opening, an exhaust opening, and an exhaust door for selectively covering the exhaust opening;

at least one heat exchanger positioned within the duct such that ambient air entering the air intake opening flows through the duct to contact the at least one heat exchanger and exits the duct through the exhaust opening, the at least one heat exchanger connected to cool the air in the combustion air intake line; and a controller connected to vary a degree that one or both of the air intake door and exhaust door is open to modulate a mass flow rate of ambient air contacting the at least one heat exchanger to vary a heat transfer from the at least one heat exchanger to the ambient air in the duct to maintain a temperature of a fluid within the at least one heat exchanger within a preferred temperature range.

2. The engine cooling system of claim 1, further comprising at least one radiator circulating coolant for the engine, the at least one radiator positioned in the duct such that ambient air entering the air intake opening contacts the at least one radiator and exits the duct through the exhaust opening; and the controller connected to vary a degree that one or both of the air intake door and the exhaust door is open to modulate a mass flow rate of ambient air contacting the at least one radiator to vary a heat transfer from the at least one radiator to the ambient air in the duct to maintain a temperature of a fluid within the at least one radiator within a preferred temperature range.

3. The engine cooling system of claim 2, wherein the cooling system provides cooling of two discrete cooling systems in the duct, a first cooling system to provide conditioned combustion air to an intake manifold of the engine and includes the at least one heat exchanger, and a second cooling system for the engine that includes the at least one radiator connected by a coolant line to the engine; and further comprising a temperature sensor to measure a temperature of coolant entering the engine.

4. The engine cooling system of claim 2, wherein the air intake door is positioned on the enclosed duct at the air intake opening upstream of the at least one heat exchanger and the at least one radiator; and the exhaust door is positioned on the enclosed duct at the exhaust opening downstream of the at least one heat exchanger and the at least one radiator.

5. The engine cooling system of claim 1, wherein the at least one heat exchanger includes at least one intercooler positioned within the duct; the combustion air intake line includes at least one turbocharger; and the at least one intercooler is connected to the combustion air intake line.

6. The engine cooling system of claim 5, wherein the combustion air intake line includes at least one bypass line connected to divert intake air in the combustion air intake line around the at least one intercooler, and a modulating valve; and the controller is connected to actuate the modulating valve to modulate an amount of combustion air diverted around the at least one intercooler through the at least one bypass line and an amount of combustion air flowing through the at least one intercooler.

7. The engine cooling system of claim 1, further comprising a check valve in the duct positioned downstream of the at least one heat exchanger.

8. The engine cooling system of claim 7, further comprising a blower connected in parallel with the check valve in the duct and configured to draw air in the duct into contact with the at least one heat exchanger.

9. The engine cooling system of claim 8, wherein the check valve is positioned adjacent the blower so that the blower and check valve span the duct downstream of the at least one heat exchanger.

10. The engine cooling system of claim 9, wherein the controller actuates the blower, the intake door, and the exhaust door.

11. The engine cooling system of claim 10, wherein the controller actuates the blower to draw ambient air across the at least one heat exchanger and out the exhaust opening, and creates a backpressure in a terminal segment of the duct downstream of the blower that closes the check valve to prevent air flow through the check valve in both a downstream and an upstream direction.

12. The engine cooling system of claim 11, wherein the controller is connected to modulate the blower to vary an amount of airflow across the at least one heat exchanger.

13. The engine cooling system of claim 1, wherein the at least one heat exchanger includes a first heat exchanger and a second heat exchanger; and wherein the combustion air intake line to the engine includes the first and the second heat exchangers, and first and second bypass lines around the first and the second heat exchangers, respectively; the first and the second bypass lines include first and second modulating valves, respectively; each of the first and the second modulating valves controlled by the controller to modulate an amount of combustion air diverted around the first and the second heat exchanger.

14. The engine cooling system of claim 13, wherein the controller is connected to vary the amount of combustion air through the first and second bypass lines in conjunction with varying the degree that one or both of the air intake door and exhaust door is open to modulate the mass flow rate of ambient air in the enclosed duct across the at least one heat exchanger to vary a heat transfer from the at least one heat exchanger to the ambient air in the duct to maintain a temperature of a fluid within the at least one heat exchanger within the preferred temperature range, while minimizing an amount of excrescence drag from the open intake door and the open exhaust door on an outer surface of an aircraft fuselage.

15. The engine cooling system of claim 14, further comprising a first temperature sensor downstream of the first heat exchanger and upstream of the second heat exchanger on the combustion air intake line; wherein the controller modulates a ratio of bypass air through the first bypass line to cooled air through the first heat exchanger by comparing a temperature detected by the first temperature sensor to a maximum permitted inlet temperature of the second heat exchanger.

16. The engine cooling system of claim 14, further comprising a second temperature sensor and a pressure sensor downstream of the second heat exchanger and upstream of the engine on the combustion air intake line; and wherein the controller is programmed with selected values for one or more of the temperature limit for an intake manifold for the engine, a desired intake pressure for the engine, and a desired mass and volumetric flow of combustion air for the engine.

17. The vehicle of claim 16, wherein the controller varies the degree that one or both of the intake door and exhaust door is open in order to modulate the mass flow rate of the ambient air in the duct across the at least one heat exchanger to maintain the temperature of the fluid within the at least one heat exchanger within the preferred temperature range, while minimizing an amount of excrescence drag from the open intake door and the open exhaust door on the outer surface of the fuselage.

18. A vehicle comprising:
an internal combustion engine having an intake manifold;
a combustion air intake line that draws air from a first air intake formed in a fuselage of the vehicle, the combustion air intake line connected to the engine intake manifold;
a compartment having an enclosed duct with a second air intake opening formed in the fuselage, an air intake door for selectively covering the second air intake opening, an exhaust opening, and an exhaust door for selectively covering the exhaust opening;
at least one heat exchanger positioned within the duct such that ambient air entering the air intake opening flows through the duct to contact the at least one heat exchanger and exits the duct through the exhaust opening, the at least one heat exchanger to cool the air in the combustion air intake line; and
a controller connected to vary a degree that one or both of the air intake door and exhaust door is open to modulate a mass flow rate of ambient air contacting the at least one heat exchanger to vary a heat transfer from the at least one heat exchanger to the ambient air in the duct to maintain a temperature of a fluid within the at least one heat exchanger within a preferred temperature range;
wherein the vehicle is selected from an aircraft, a land vehicle, an amphibious vehicle, a marine vehicle, and a submarine vehicle.

19. A method for making a cooling system for an engine in a vehicle, the vehicle including a combustion air intake line that draws air from a first air intake formed in a fuselage of the vehicle, the combustion air intake line connected to an engine intake manifold for a vehicle engine, the method comprising:
forming a housing having an enclosed duct including a second air intake opening formed in the fuselage, an air intake door for selectively covering the second air intake opening, an exhaust opening, and an exhaust door for selectively covering the exhaust opening;
placing at least one heat exchanger within the duct between the air intake opening and the exhaust opening such that ambient air entering the air intake opening flows through the duct to contact the at least one heat exchanger and exits the duct through the exhaust opening, the at least one heat exchanger connected to cool the air in the combustion air intake line;
connecting a controller to actuate the air intake door and the exhaust door to a fully open position and a fully closed position, as well as positions intermediate the fully closed position and the fully open position; and
programming the controller to vary a degree that one or both of the air intake door and exhaust door is open to modulate a mass flow rate of ambient air contacting the at least one heat exchanger to vary heat transfer from the at least one heat exchanger to the ambient air in the duct to maintain a temperature of a fluid within the at least one heat exchanger within a preferred temperature range.

20. The method of claim 19, wherein programming the controller includes programming the controller to vary a degree that one or both of the intake door and exhaust door is open in order to modulate a mass flow rate of the ambient air in the duct across the at least one heat exchanger to maintain the temperature of the fluid within the at least one heat exchanger within the preferred temperature range, while minimizing an amount of excrescence drag from the open intake door and the open exhaust door on the outer surface of the fuselage.

* * * * *